United States Patent [19]

Ochiai et al.

[11] 4,232,757

[45] Nov. 11, 1980

[54] AUTOMOBILE SPEED CONTROL METHOD AND SYSTEM

[75] Inventors: Takeshi Ochiai; Masahito Muto, both of Toyota; Naoji Sakakibara, Chiryu; Shoji Kawata, Okazaki, all of Japan

[73] Assignees: Aisin Seiki Kabushiki Kaisha, Kariya; Toyota Jidosha Kogyo Kabushiki Kaisha, Toyota, both of Japan

[21] Appl. No.: 900,623

[22] Filed: Apr. 27, 1978

[30] Foreign Application Priority Data

Apr. 28, 1977 [JP] Japan .................................. 52/49438

[51] Int. Cl.² ........................................... B60K 31/00
[52] U.S. Cl. .................................... 180/176; 123/353; 180/177
[58] Field of Search ............... 180/105 E, 105 R, 108, 180/110, 170, 175, 176, 177; 123/32 EA, 32 EB, 32 ED, 102

[56] References Cited

U.S. PATENT DOCUMENTS

| Re. 27,324 | 3/1972 | Granger et al. | 180/176 |
|---|---|---|---|
| 3,372,680 | 3/1968 | Scholl | 123/102 X |
| 3,381,771 | 5/1968 | Granger et al. | 180/176 |
| 3,477,346 | 11/1969 | Slavin et al. | 91/361 |
| 3,485,316 | 12/1969 | Slavin et al. | 180/176 |
| 3,570,460 | 3/1971 | Rabus | 123/102 X |
| 3,575,256 | 4/1971 | Jania et al. | 180/176 |
| 3,793,622 | 2/1974 | Hida et al. | 180/176 X |
| 3,952,829 | 4/1976 | Gray | 180/177 X |
| 4,056,157 | 11/1977 | Kawata | 180/176 |

Primary Examiner—John J. Love
Assistant Examiner—Milton L. Smith
Attorney, Agent, or Firm—Sughrue, Rothwell, Mion, Zinn and Macpeak

[57] ABSTRACT

Automobile speed control to maintain actual automobile speed at a desired automobile speed, in which a superposed electrical analog signal formed by a first electrical signal indicating actual automobile speed and a feedback signal indicating fuel injection duration in an engine of an automobile is supplied to a comparator which compares it with a second electrical signal indicating desired automobile speed and memorized on a capacitor. The differential signal or error signal at the output of the comparator circuit is supplied to a servomotor which controls the position or opening of a throttle valve of the engine. The feedback signal is supplied from an injection time signal generator circuit which, in response to a fuel injection command signal from an electronic fuel injection control device associated with the engine, generates an electrical analog signal corresponding to fuel injection duration.

7 Claims, 5 Drawing Figures

AUTOMOBILE SPEED CONTROL METHOD AND SYSTEM

BACKGROUND OF THE INVENTION

The present invention relates to improvement in speed control methods and systems for automobiles. More particularly, the invention relates to a speed control method and system which maintains the speed of an automobile at a stabilized desired value by employing a feedback loop.

Speed controls for automobiles are now in commercial use, in which the actual speed of an automobile is compared with a preselected desired value to generate an error signal for controlling a throttle valve to a position at which the actual speed corresponds to the preselected value. Generally speaking, automatic speed control of automobiles requires stabilization of the speed control system. If the stabilization should not be sufficient, so-called hunting, overshoot or undershoot of the actual speed of the automobile, occurs. The hunting can be prevented by deteriorating the responsibility and accuracy of the speed control system. However, the hunting can also be prevented without deteriorating this responsibility by employing negative feedback control of the throttle valve as shown in U.S. Pat. No. 3,381,771 (issued May 7, 1968). In the invention of the patent, an actual speed indication signal from a tachometer generator of an automobile speedometer and a preselected desired speed indication signal from a speed set potentiometer are supplied to a comparator circuit to generate an error signal to control the throttle valve position. Then the error signal is supplied to a differential amplifier circuit together with a throttle position feedback signal (the negative feedback signal) from a feedback potentiometer linked with the throttle valve. An output signal from the differential amplifier circuit is supplied to a vacuum modulator which in response thereto provides to a vacuum motor vacuum pressure related to the output signal. The vacuum motor is mechanically ganged to the throttle valve and controls its position. Thus the output differential signal of the differential amplifier regulates the position of the throttle valve. The negative feedback control of the throttle valve position prevents extra movement of the throttle valve toward opening or closing. Therefore, over-acceleration and -deceleration of the automobile are prevented. The desired speed set on the speed set potentiometer is altered by rotating a lever connected to the slider of the potentiometer. Similar speed controls for automobiles are disclosed in U.S. Pat. No. Re. 27,324 (issued Mar. 28, 1972), U.S. Pat. No. 3,477,346 (issued Nov. 11, 1969), U.S. Pat. No. 3,485,316 (issued Dec. 23, 1969), U.S. Pat. No. 4,056,157 (issued Nov. 1, 1977). However, this negative feedback of the throttle valve position is relatively difficult to implement, because a transducer, such as a potentiometer, which is linked with a throttle drive system (from an accelerator pedal to the throttle valve) and which generates a throttle position feedback signal, is required, and the space to accommodate the transducer is limited (since the throttle drive system is installed in a limited narrow space, and vibration of the transducer should be prevented). Also, connection of the transducer to the throttle drive system increases the load on the throttle drive system, which requires increased operation force. Potentiometers in an engine compartment may wear out in a relatively short time because of vibration, dust, high temperature and humidity. Also, a negative feedback circuit without use of a feedback potentiometer, and which compares a speed error signal with an actual automobile speed signal to generate a negative feedback signal, is disclosed in U.S. Pat. No. 3,952,829 (issued Apr. 27, 1976). Further, a negative feedback circuit without use of a feedback potentiometer, and which has a circuit means for retarding the speed error signal to be supplied to a desired speed signal generator circuit as the negative feedback signal, is disclosed in U.S. Pat. No. 3,793,622 (issued Feb. 19, 1974). In the prior art, systems for maintaining automobile speed constant have a speed memorization capacitor to which a first electrical signal, indicating actual speed, is applied, and a set switch to close the charging loop of the capacitor for memorization of actual speed (as can be seen in U.S. Pat. No. 3,485,316); and the memorized voltage level of the capacitor is supplied to the comparator as a desired speed indication signal.

SUMMARY OF THE INVENTION

One object of the present invention is to obtain a feedback signal to stabilize the speed control of an automobile without connecting the transducer to the throttle drive system. Another object of the present invention is to eliminate mechanical elements or devices to generate the feedback signal. A further object of the present invention is to provide an automobile speed control system easily fitted to the automobile and having stabilized preselected speed control characteristics.

According to the present invention, the feedback signal is obtained from an electronic fuel injection control device (hereinafter EFI) through a feedback signal generator circuit. Recently, many engines on automobiles have the EFI device for operating engines in properly suitable conditions adequate to economical fuel consumption and reduction of detrimental oxide in exhaust gas. The EFI device is constructed with an electronic circuit or large scale integrated circuit semiconductor device which receives signals indicating ignition repetition rate, intake air flow rate, intake air temperature, starter voltage, cooler water temperature, throttle position, battery voltage, etc., and generates a fuel injection control signal on the basis of the operation logic or program. The output fuel injection control signal of the EFI device corresponds to the engine output or driving torque of an automobile. Thus the fuel injection control signal is employed as the feedback signal so as to prevent over-acceleration and -deceleration in the present invention.

BRIEF DESCRIPTION OF THE DRAWING

The preferred embodiment shown in FIG. 1 is designed so as to apply the invention to automobiles equipped with engines having EFI which generates an injection time duration control signal. Fuel is supplied to the engines at a constant rate. The injection time duration determines quantity of the fuel being supplied to the engines. Referring to FIG. 1, a speed signal generator circuit 1 is energized by the speedometer cable of the automobile and generates a first electrical signal, the value of which is proportional to actual automobile speed. The first electrical signal is supplied to a speed signal memorizing circuit 3 and analog adder circuit 12. A switch circuit 2 is connected with speed signal memorizing circuit 3, and controls the operation of memorizing circuit 3 in response to switching operations of the driver of the automobile. The speed signal memorizing circuit 3 memorizes the first signal level, i.e. actual speed, at the time when the switch circuit 2 is actuated by the driver. The memorized signal in memory circuit 3, as well as the output of adder circuit 12, are applied to a comparator circuit 4. A fuel injection control signal from EFI 10 is supplied to an injection time signal generator circuit 13, which in turn generates a feedback signal indicating duration of fuel injection and supplies it to adder circuit 12. Adder circuit 12 superposes the feedback signal on the first electrical signal. Thus the comparator circuit 4 compares the memorized signal level in memory circuit 3 with the superposed signal and provides the difference between the memorized signal level and the superposed signal level. The output of differential signal of comparator circuit 4 is amplified to an energization level of servomotor 6 which drives the throttle valve in an engine 7 of the automobile. The output fuel injection control signal of EFI 10 energizes a fuel injector 11 which in turn supplies fuel to engine 7. The energization signal supplied from amplifier circuit 5 to servomotor 6 is interrupted by an operation prohibition circuit 8 which is energized or deenergized to interrupt the energization signal supplied by switch circuit 9. The feedback signal from injection time signal generator circuit 13 is employed as a negative feedback signal for stabilizing operation of the throttle valve position control system including comparator circuit 4, amplifier circuit 5 and servomotor 6. The feedback signal may be superposed on the output signal level of memory circuit 3 or supplied directly to comparator circuit 4 as a negative feedback signal. Therefore, adder circuit 12 may be connected to memory circuit 3 or eliminated. The blocks 1 through 13 in FIG. 1 represent concrete circuit portions shown in FIG. 2.

Referring to FIG. 2, speed signal generator circuit 1 includes a reed switch 17, resistors 18 and 25, capacitors 21 and 24, and diodes 22 and 23. One terminal of reed switch 17 is connected to ground 19 and its other terminal is connected to one terminal of resistor 18. The other terminal of resistor 18 is connected with constant line 20. The reed switch 17 opens and closes alternately in synchronism with the rotation of a magnet 2 which is driven to rotate at the same speed as the speedometer cable of the automobile. Thus, the ON, OFF repetition frequency of reed switch 17 is proportional to actual automobile speed, and the voltage level at the connection point between reed switch 17 and resistor 18 pulsates between the constant voltage level of line 20 and ground level. The pulsation is transmitted to capacitor 24 through capacitor 21 and diode 23. In the open state of reed switch 17, capacitors 21 and 24 are charged by the constant voltage at line 10 through resistor 18 and diode 23, whereas capacitor 21 discharges through reed switch 17 and diode 22 in the closed state of reed switch 17. Thus capacitor 24 accumulates positive pulses of the pulsation. However, resistor 25 discharges capacitor 24 with a time constant. Therefore, an analog signal having a ripple thereon appears at the connection point between capacitor 24 and resistor 25. The mean voltage level of the signal corresponds to actual automobile speed, and the ripple thereon corresponds to the ON, OFF repetition frequency of reed switch 17.

Figure 1:
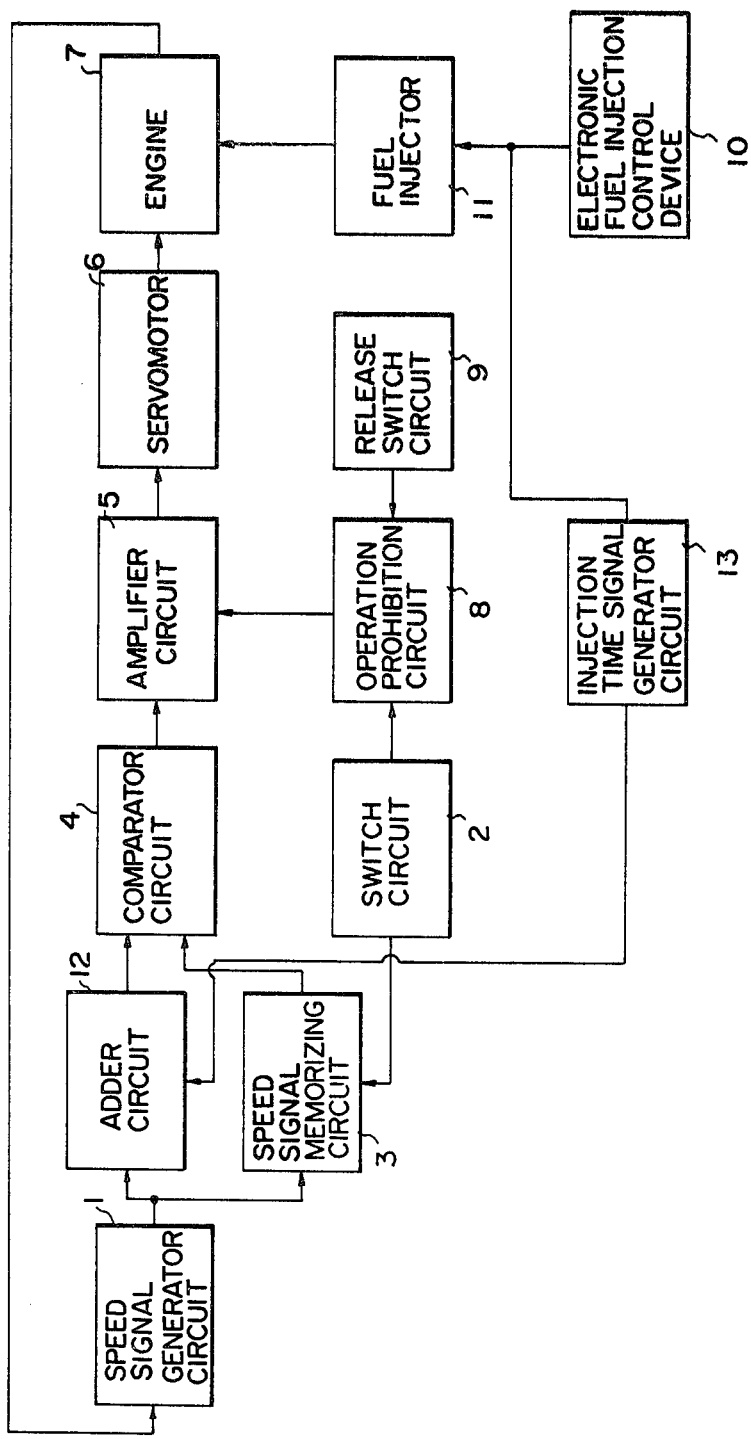
FIG. 1 is a block diagram illustrating a preferred embodiment of the present invention.

The analog signal is supplied to one terminal of resistor 26 in speed signal memorizing circuit 3. The other terminal of resistor 26 is connected to a resistor 27 and a reed switch 29 in memory circuit 3, and a resistor 37 in adder circuit 12. A memory capacitor 34 is serially connected between reed switch 29 and ground. Thus capacitor 34 memorizes the analog signal level, indicating actual automobile speed, upon the closure of reed switch 29. Reed switch 29 is operated to close by a coil 31 which is connected to constant voltage line 20 and switch circuit 2. The serial connection of resistor 27 and a transistor 28 is connected in parallel with the serial connection of reed switch 29 and capacitor 34 of high insulation. The positive voltage terminal of capacitor 34 is connected to the gate of a FET (Field Effect Transistor) 35, the drain of which is connected to constant voltage line 20 and the source of which is connected to ground 19 through a resistor 36. Voltage at the source of FET 35 is supplied to comparator 39 through a resistor 40. A diode 33 is connected in parallel with coil 31 for surge absorption. Switch circuit 2 includes a diode 32 and a set switch 55 which is connected to ground 19. Closure of set switch 2 energizes coil 31 to close reed switch 29 and deenergizes transistor 28 to turn OFF. Adder circuit 12 includes resistors 37 and 38, the former of which receives the actual speed indication signal from speed signal generator circuit 1 through resistor 26, whereas the latter receives a feedback signal from injection time signal generator circuit 13. The resistors 37 and 38 are connected with the minus input terminal of comparator 39, the plus input terminal of which is connected to the source of FET 35 through resistor 40. Thus comparator 39 in comparator circuit 4 supplies a differential signal which indicates the difference between the voltage level at the source of FET 35, and the superposed voltage composed of the actual speed signal from the circuit 1 and the feedback signal from the circuit 13. Amplifier circuit 5 includes resistors 42 and 43 serially connected between the output terminal of comparator 39 and ground 19, transistor 41 and diode 47. The base of transistor 41 is connected with the intermediate connection point between resistors 42 and 43. The collector of transistor 41 is connected to servomotor 6. The emitter of transistor 41 is connected to a reed switch 48 in operation prohibition circuit 8 through diode 47 which interrupts application of reversed voltage to transistor 41. Operation prohibition circuit 8 includes the reed switch 48 and a coil 49. The positive terminal of reed switch 48 is connected to one terminal of coil 49, anode of diode 32 and cathode of diode 63. The other terminal of coil 49 is connected to the positive terminal of battery 54 through ignition switch 67 and power switch 68 for desired constant speed driving control. Reed switch 48 is connected to ground 19 through a lamp 50, and to the positive terminal of battery 54 through stop switch 52 which is operated by braking pedal 51. Injection time signal generator circuit 13 includes resistors 58 and 61, a transistor 59 and a capacitor 62. The injection control signal from EFI 10 is applied to the base of transistor 59 through resistor 58. The injection control signal is a train of pulses, the low level duration of which corresponds to the fuel injection interval and the high level duration of which corresponds to stoppage of fuel injection. The transistor 59 in injection time signal generator circuit 13 is thus energized to turn ON during stoppage of fuel injection, and deenergized to turn OFF during fuel injection. The capacitor 62 in the circuit 13 is charged in the OFF state of transistor 59 through resistors 60 and 61 and, discharges in the ON state of transistor 59 through resistor 61 and transistor 59. However, the resistance of resistor 61 is so determined as to reduce ripple on and discharge of capacitor 62 during the ON state of transistor 59. The anode and cathode of an additional diode may be connected with the collector of transistor 59 and capacitor 62, respectively, for increasing the charging current of capacitor 62. The voltage level on capacitor 62 thus pulsates in response to the repetition rate of fuel injection, i.e. rotational speed of the engine. The voltage level of capacitor 62 corresponds to the low level duration (fuel injection interval) of the injection control signal from EFI 10. By adjusting the resistance of resistors 26 and 27, the voltage level at the minus input terminal of comparator 39 balances with that of the plus input terminal when the automobile runs at the desired constant speed memorized on capacitor 34. However, this adjustment may be difficult for all speed ranges of the automobile; therefore, the resistance of resistors 26 and 27 may be adjusted for a middle speed range. Additional bias voltage may be applied to an input terminal of comparator 39 for adjusting balance of two input voltages in full speed range. EFI 10 is well known and includes sensors for detecting ignition repetition rate, intake air flow rate, intake air temperature, starter voltage, cooler water temperature, throttle position, battery voltage, etc., and electronic circuit means calculating fuel quantity to be supplied to the engine on the basis of engine operation logic or program and energizing output power transistor 57. A coil 56 of fuel injector 11 is connected between the collector of transistor 57 and battery 54 through ignition switch 67. Positive voltage of battery 54 is supplied through ignition switch 67, power switch 68 and power line 46 to voltage regulator circuit 64 comprising a Zener diode 66, a resistor 65 and a diode 167. One terminal of resistor 65 and the cathode of Zener diode 66 are connected to constant voltage line 20, whereas the anode of Zener diode 66 is connected to ground 19. The other terminal of resistor 65 is connected to power line 46 and the cathode of diode 167. The anode of diode 167 is connected to the collector of transistor 41. Servomotor 6 includes a vacuum actuator 69 and a solenoid valve 44 which is operated with a coil 45 and a spring 83. Vacuum actuator 69 is constructed with a housing 70, a cover 71, a diaphragm 72, a retainer 73, a pressure plate 74, a rivet 75 and a spring 76. The retainer 73, diaphragm 72 and pressure plate 74 are connected to each other by caulking rivet 75. The spring 76, contained within pressure compartment 77, tends to expand compartment 77 by pushing pressure plate 74 toward the left while the greater pressure of the atmosphere outside diaphragm 72 works against the spring force, displacing the diaphragm 72 to the point where the pressure difference inside and outside diaphragm 72 balances with the spring force. A pipe 78 is connected between compartment 77 of vacuum actuator 69 and a common inlet port 79 of modulator valve 44. The normally opened outlet port of modulator valve 44 is connected to atmospheric pressure through an orifice 84 and an air filter 85, and the normally closed outlet port 80 of modulator valve 44 is connected to intake manifold 86 through an orifice 81 and a pipe 82. The rivet 75 is connected to a link member 89 through a chain 87, one end of which is connected to a spring 91 which in turn applies a force to link member 89 and chain 87 toward closure of the throttle valve 88 in the engine 7. The throttle valve 88 is connected with one end of link member 89, the other end of which is connected to an accelerator pedal 90 with a link mechanism. Fuel 92 is supplied to engine 7 from fuel injector 11.

Assuming that ignition switch 67 and power switch 68 are closed and the automobile is running, magnet 16 rotates at a speed which corresponds to actual automobile speed. The capacitor 21 in speed signal generator circuit 1 charges and discharges in response to rotation of magnet 16 and supplies a train of pulses to the anode of diode 23. Capacitor 24 is charged by the positive duration of the pulses. The charged voltage of capacitor 24 is determined by the constant voltage of line 20, resistance of resistors 18 and 25 and capacitance of capacitor 24, and is proportional to actual automobile speed. The voltage of capacitor 24 has a ripple corresponding to the ON, OFF repetition frequency of reed switch 17. Thus, the frequency of the ripple corresponds to actual automobile speed. At a desired actual automobile speed, the driver momentarily closes set switch 55 in switch circuit 2 to drive the automobile automatically thereafter at desired actual automobile speed. By closing set switch 55, coil 49 is energized to close reed switch 48 through switches 67 and 68, power line 46 and set switch 55. Thus, the self maintaining circuit for reed switch 48, which is constructed with the switches 67 and 68, coil 49, reed switch 48 and lamp 50, is closed, and the emitter of transistor 41 is connected to ground through diode 47, reed switch 48 and lamp 50. The lamp 50 is energized to light and informs the driver that automatic constant speed control is set. At the same time, coil 31 is energized to close reed switch 29, and transistor 28 is deenergized to turn OFF, so that the actual automobile speed signal level at the input terminal of reed switch 29 rises from the divided lower level, which is determined by the values of resistors 26 and 27, and is applied to memory capacitor 34. At this time, ripple on the speed signal is reduced because of the filter operation of the memory capacitor 34. Thus, the capacitor 34 is charged to speed signal level. By opening the set switch 55, transistor 28 turns ON and reed switch 29 opens. The memory capacitor 34 thereafter holds the actual automobile speed signal level at the opening of the set switch 2. The capacitor 34 acts as a filter to depress the ripple on the speed signal at closure of set switch 55 as described above. Therefore, a substantially mean level of the speed signal is memorized on capacitor 34. The coil 49 is energized to hold reed switch 48 in its closed state after opening of set switch 55. Capacitor 62 in injection time signal generator circuit 13 is discharged during closure of set switch 55 through diode 63 and set switch 55 for clearing the injection time signal supplied before closure of set switch 55.

The voltage level of capacitor 34 is applied to the plus terminal of comparator 39 in an impedance conversion mode through FET 35 and resistor 40. The insulation of reed switch 29 and capacitor 34 is sufficient to prevent discharge of capacitor 34, and also leakage current at the base of FET 35 is quite small. Thus, capacitor 34 continues to hold a voltage level substantially equal to the speed signal level at closure of set switch 55. After opening of set switch 55, the voltage level at the input terminal of reed switch 29 is a divided lower one because of the ON state of transistor 28, and the voltage level of capacitor 62 is substantially zero (ground). Therefore, the voltage level at the minus input terminal of comparator 39 is the lower one, whereas the voltage level at the plus input terminal of comparator 39 is a higher voltage which corresponds to the memorized speed signal level. The comparator 39, therefore, supplies high voltage to turn ON transistor 41. However, the speed signal from speed signal generator 1 to the minus input terminal of comparator 39 has ripple thereon. Therefore, the output of comparator 39 pulsates. The high duration of pulsation corresponds to the difference between the voltage level at the minus input terminal and plus input terminal of comparator 39. Thus, transistor 41 is energized to turn ON and OFF alternately and the ON duration corresponds to the voltage difference at the input terminals of comparator 39. Coil 45 in servomotor 6 is energized during the ON state of transistor 41, and forces solenoid valve 44 to connect pipe 78 to pipe 82 so as to supply the vacuum pressure in intake manifold 86 to compartment 77 of vacuum actuator 69. On the contrary, spring 83, during the OFF state of transistor 41, forces solenoid valve 44 to connect pipe 78 to air cleaner 85 so as to supply atmospheric pressure into compartment 77 of vacuum actuator 69. Thus, solenoid valve 44 vibrates in response to energization and deenergization of coil 45 i.e. ON, OFF of transistor 41. Therefore, vacuum pressure in compartment 77 of vacuum actuator 69 corresponds to the ON duration of transistor 41, namely, voltage difference at the input terminals of comparator 39. Diaphragm 72 is forced to move in response to vacuum pressure in compartment 77. Thus the position or opening of throttle valve 88 corresponds to the ON duration of transistor 41, namely, voltage difference at the input terminals of comparator 39. In a short time after momentary closure of set which 55, the ON duration of transistor 41 increases because of the larger voltage difference at the input terminals of comparator 39, and vacuum pressure in compartment 77 may also increase. However, solenoid valve 44 and vacuum actuator 69 have a delay time for responding to the energization of coil 45. This delay time is adjusted by orifices 81 and 84. Within the delay time, capacitor 62 in injection time signal generator circuit 13 is charged to a level which corresponds to the fuel injection duration and rotational speed of engine 7, by the injection control signal from EFI 10. The voltage level on capacitor 62 rises to the voltage level at the minus input terminal of comparator 39, whereby the ON duration of transistor 41 decreases. The rise of voltage at the minus input terminal of comparator 39 is smooth. Thus, decrease of the ON duration of transistor 41 is smooth. Therefore, increase in vacuum pressure in compartment 77 of vacuum actuator 69 is prevented, and the pressure stabilizes at a value which holds throttle valve 88 at a position at which the actual automobile speed balances with the desired speed memorized on memory capacitor 62. Thereafter, the automobile runs at the constant speed memorized on capacitor 34. Assuming that the automobile runs up a slope and the actual speed falls below the constant speed, the voltage level at the minus input terminal of comparator 39 falls and the high level duration of the ouput signal of comparator 39 becomes longer than before, whereby vacuum pressure in compartment 17 increases to increase the opening of throttle valve 88. Thus the actual automobile speed rises. On the contrary, assuming that the automobile runs down a slope and the actual speed rises above constant speed, the voltage level at the minus input terminal of comparator 39 rises, and the high level duration of the output signal of comparator 39 becomes shorter than before, whereby vacuum pressure in compartment 77 increases to decrease the opening of throttle valve 88. Thus, the actual automobile speed falls. At this speed control stage, over-acceleration or -deceleration may occur because of time lag in the operation of solenoid valve 44 and vacuum actuator 69. Also, so called hunting, overshoot or undershoot may occur, due to the over-acceleration and -deceleration. However those are prevented by the feedback signal from the injection time signal generator circuit 13, because capacitor 62 supplies a negative feedback signal to the minus input terminal of comparator 39. Therefore, assuming that actual speed falls below the desired speed memorized on capacitor 34 and comparator 39 energizes transistor 41 to turn ON in a relatively long time, then the vacuum pressure in compartment 77 gradually increases and throttle valve 88 gradually moves toward its full open position. Thus, intake air flow of the engine 7 increases gradually, and is detected by EFI 10. EFI 10 therefore increases the energization interval of coil 56 and the voltage of capacitor 62 rises gradually. Therefore the voltage level at the minus input terminal of comparator 39 gradually rises in response to increase in the opening of throttle valve 88. Therefore, the ON duration of transistor 41 gradually becomes shorter. And finally, increase in vacuum pressure in compartment 77 stops, and throttle valve 88 stops, at a new position at which the actual automobile speed balances with the desired speed memorized on capacitor 34. As described above, the voltage level on capacitor 62 rises to prevent over-acceleration. Air flow rate and fuel supply are parameters of driving torque of the engine and are fed back to comparator 39. Assuming that actual speed rises above desired speed and the ON duration of transistor 41 decreases, the intake air flow rate decreases. Then the energization duration of coil 56 is decreased by EFI 10 and the voltage level of capacitor 62 falls to increase the ON duration of transistor 41, which prevents over-deceleration. The operations of EFI 10, injection time signal generator circuit 13 and comparator 39 are in the phase leading mode against alteration of actual automobile speed, and are quite quick as compared with operation of vacuum actuator 69. Therefore position control of throttle valve 69 is smooth and stabilized. When braking pedal 51 is depressed during constant speed control, stop switch 52 is closed, whereby coil 49 is shunted by stop switch 52 and reed switch 48. Thus, coil 49 is deenergized and reed switch 48 opens. Then coil 45 is deenergized and constant speed control is interrupted.

The voltage level on capacitor 62 rises in response to increase of fuel injection time and rotational speed of the engine. In automobiles having automatic speed change devices (e.g. torque converters), actual automobile speed alters after alteration of engine speed. Therefore, the system shown in FIG. 1 preferably operates in phase leading control mode on automobiles having torque converters. As compared with this, actual automobile speed alters with alteration of engine speed in automobiles having manual speed change devices (e.g. speed change gears). Therefore, the system shown in FIG. 1 does not operate in a phase leading mode on automobiles having manual speed change devices.

Thus, so-called hunting may occur. Also, the system controls actual automobile speed relatively lower than the desired speed memorized on capacitor 34 in the high speed range, because the voltage level on capacitor 62 increases relatively at the higher speeds in the high speed range.

Figure 2:
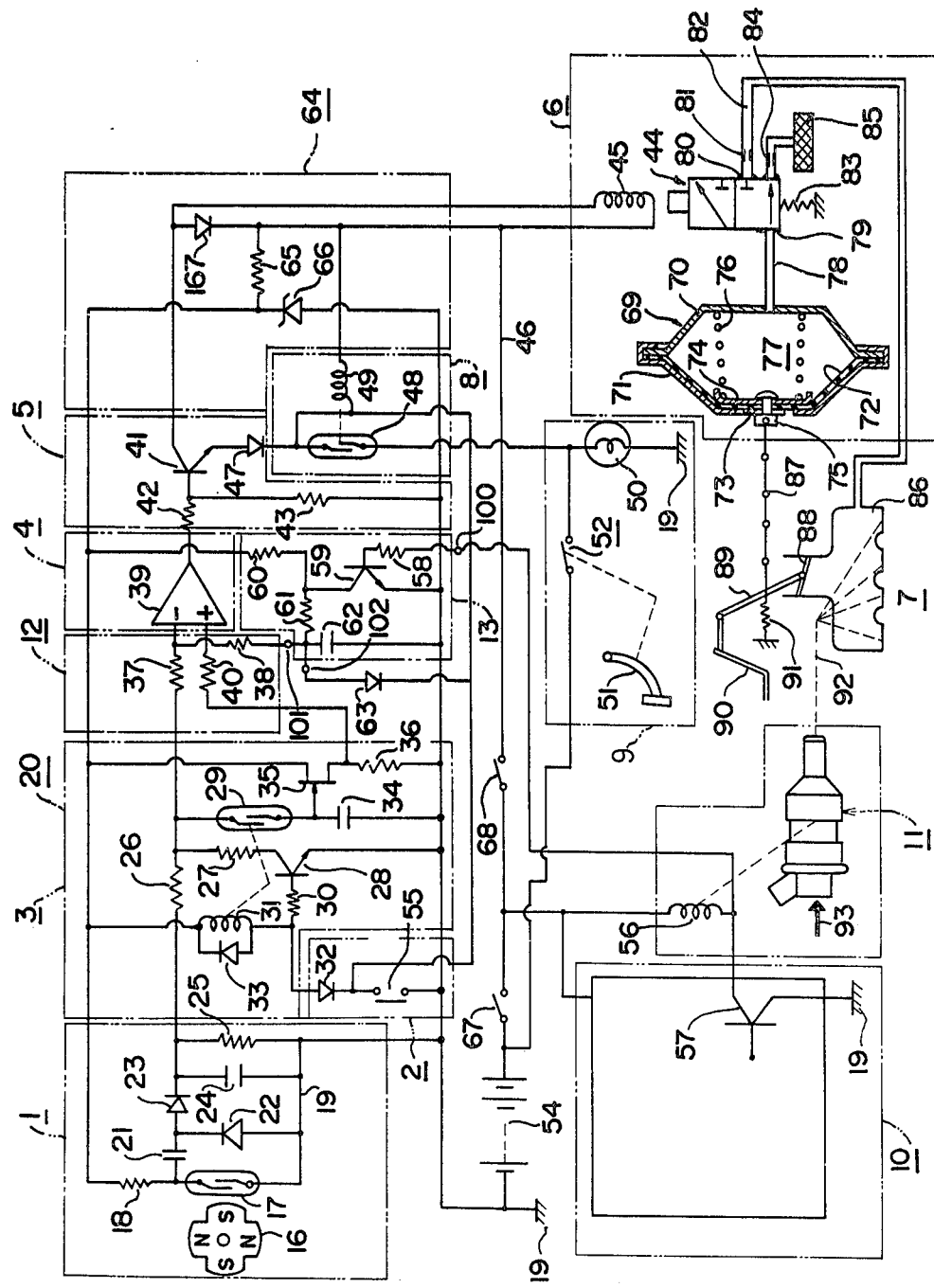
FIG. 2 is a circuit diagram illustrating the preferred embodiment of the present invention in a concrete form.
Figure 3:
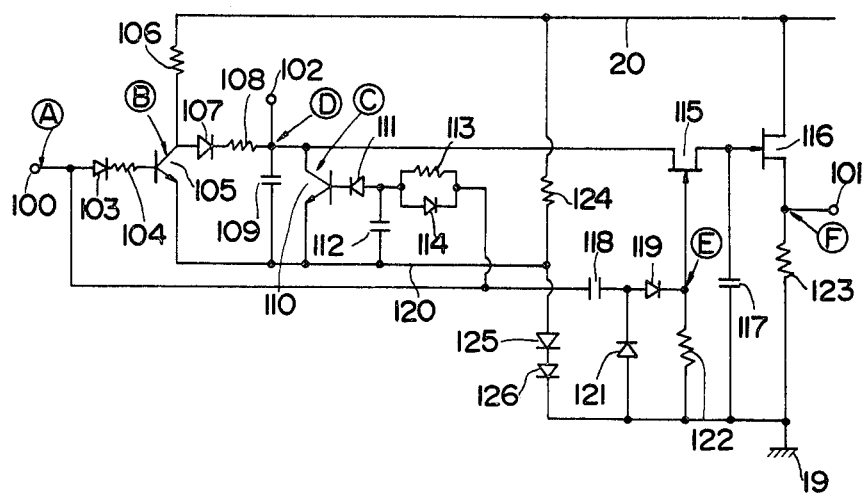
FIG. 3 is a circuit diagram illustrating a modified injection time signal generator circuit of the present invention.
Figure 4:
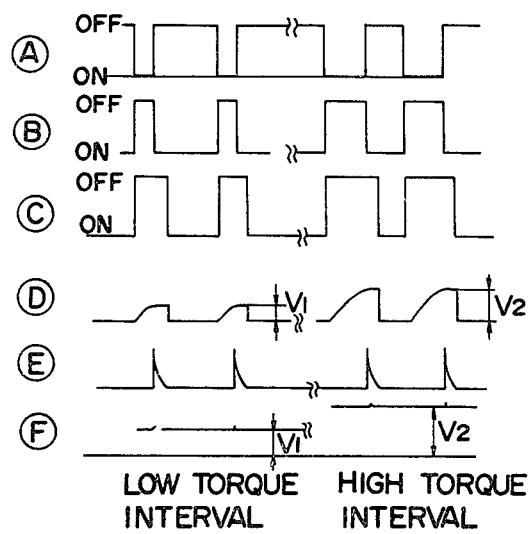
FIG. 4 is a chart illustrating signal levels at some parts of the circuit shown in FIG. 3.

The injection time signal generator circuit shown in FIG. 3 is a modified one to prevent hunting on automobiles having manual speed change devices. The modified circuit shown in FIG. 3 will be connected with the system shown in FIG. 2 in place of the circuit 13 including resistor 58, transistor 59 and capacitor 62. Input terminal 100 shown in FIG. 3 will be connected to the collector of transistor 57 in EFI 10. Output terminal 101 shown in FIG. 3 will be connected to the minus input terminal of comparator 39 through resistor 38, and discharge terminal 102 will be connected to the anode of diode 63. The input terminal 100 is connected to the base of a transistor 105 through a diode 103 and a resistor 104. The emitter and collector of transistor 105 are respectively connected to bias line 120 and to the discharge terminal 102 through a diode 107 and resistor 108. The collector is also connected to constant voltage line 20 through resistor 106. A capacitor 109 and a transistor 110 are connected in parallel between the terminal 102 and bias line 120. The cathode of a diode 111 is connected with the base of transistor 112, and the anode is connected to a capacitor 112 and parallel connection of a resistor 113 and diode 114. The parallel connection of resistor 113 and diode 114 is connected to the input terminal 100. The discharge terminal 102 is connected with the drain of a first FET 115. The source of FET 115 is connected with the gate of a second FET 116 and a capacitor 117. The gate of the first FET 115 is connected to input terminal 100 through a capacitor 118 and a diode 119. A diode 121 is connected between the anode of diode 119 and ground 19. The cathode of diode 119 is connected to ground through a resistor 122. The drain of the second FET 116 is connected to the output terminal 101 and a resistor 123. Resistor 124 and diodes 125 and 126 are connected between constant the voltage line 20 and ground 19 for shifting up voltage of bias line 120. Capacitor 118 and diode 119 are connected between input terminal 100 and the gate of the first FET 115 for generating differential pulses at a rise of the input signal and for supplying them to the gate of the first FET 115. The input terminal 100 receives pulses Ⓐ, as shown in FIG. 4 from the collector of transistor 57. Transistor 105 turns ON during a low interval of the input signal Ⓐ, so that the collector of transistor 105 pulsates as shown by Ⓑ in FIG. 4. Transistor 110 is energized to turn ON with input signal Ⓐ through resistor 113. However, application of the high voltage pulse of signal Ⓐ to the base of transistor 110 is delayed because of the time constant of resistor 113 and capacitor 112. Turning OFF of transistor 110 is not delayed, because capacitor 112 discharges through diode 114, terminal 100 and transistor 57. Voltage Ⓒ of the collector of transistor 110 is shown in FIG. 4. Capacitor 109 is charged during the OFF state of transistors 105 and 112. Thus voltage Ⓓ of capacitor 109 alters as shown in FIG. 4. After the turning OFF of transistor 110, transistor 105 turns ON. However, discharge of capacitor 109 is prevented by diode 107. At turning OFF of transistor 57, a positive pulse Ⓔ as shown in FIG. 4 is supplied to the gate of FET 115 to turn it ON. Therefore, the first FET 115 connects capacitor 109 capacitor 117, so that capacitor 117 is charged to voltage level Ⓓ of capacitor 109 (charge transmission). After the turning OFF of first FET 115, the capacitor 117 holds the pulse height of Ⓓ which is amplified and supplied from output terminal 101 through the second FET 116 (impedance conversion). After the turning OFF (pulse Ⓔ) of FET 115, transistor 110 turns ON to discharge capacitor 109. The first and second FET 115 and 116 are of the depression type, and resistor 124 and diodes 125 and 126 are connected so as to obtain $V_{GS}$ OFF bias for turning OFF FET 115. The capacitor 109 is charged to a voltage level proportional to the ON duration (which corresponds to injection time) of transistor 57, and the voltage level is transmitted to memory capacitor 117. Therefore, the output signal Ⓕ is a static voltage level having no ripple. The voltage level of the output signal Ⓕ is proportional to fuel injection time and has no relation to the fuel injection repetition rate, i.e., rotational speed, of the engine. The voltage level of Ⓕ thus corresponds to output torque of the engine. However, the time constant of the accumulation circuit constructed with capacitor 112 and resistor 113 is so determined as to turn ON, in the high speed range, transistor 110 before capacitor 109 has been fully charged up to a level which corresponds to injection time, because higher engine torque is required in the high speed range for overcoming the greater running resistance of the automobile.

Figure 5:
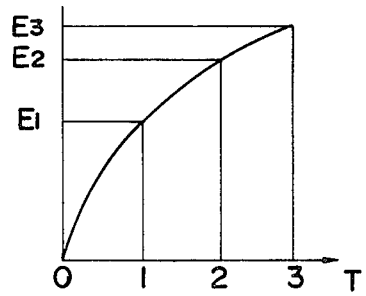
FIG. 5 is a graph illustrating rise of voltage potential at E shown in FIG. 3, the transversal axis of which indicates lapse of time.

As described before, injection time signal generator circuit 13 shown in FIG. 2 generates the feedback signal corresponding to the combination of engine torque and engine speed, and having a ripple synchronized with fuel injection repetition. Thus, adjustment of resistors 26 and 27 is somewhat important, because, if the resistance values of resistors 26 and 27 are selected such that two input signal levels of comparator 39 balance when the automobile runs at the desired speed memorized on memory capacitor 34 in the middle speed range, then the voltage level at the minus input terminal of comparator 39 balances with that of the plus input terminal after actual speed exceeds desired speed and before actual speed rises to the desired speed in the lower and higher speed ranges, respectively. Thus, the automobile runs at a relatively higher speed, as compared with the desired one in the lower speed range, and runs at a relatively lower speed as compared with the desired one in the higher speed range. As compared with the circuit 13 shown in FIG. 2, the injection time signal generator circuit shown in FIG. 3 generates a feedback signal having no ripple. Therefore it is easy to obtain a differential signal from the feedback signal and supply it to the adder circuit 12 by connecting an additional capacitor to output terminal 101. In this case, constant actual automobile speed may be balanced with desired speed on memory capacitor 34 by increasing the resistance of resistor 38 for depressing static (direct) voltage. Since hunting is an up and down alteration of actual speed and causes a differential signal, it may be prevented by negatively feeding back the differential signal to comparator 39. Injection time signal generator circuit 13 shown in FIG. 2 has a integration circuit comprising resistor 61 and capacitor 62. Also the injection time signal generator circuit shown in FIG. 3 has an integration circuit having resistor 108 and capacitor 109. That this integration circuit has an exponential characteristic as shown in FIG. 5 with respect to increasing capacitor voltage is well known. Therefore, the voltage level on capacitor 62 or 109 changes more at shorter fuel injection times and less at longer fuel injection times. This means that negative feedback control is stronger at lower loads of the engine. Thus decrease of hunting is effective, because the possibility of hunting is high at lower loads of the engine.

Obviously many modifications and variations of the present invention are possible in the light of the above teachings; for example, the present invention may be applied to automobiles having a fuel injector which controls fuel injection by altering the pressure or the orifice opening for fuel injection, in which case a fuel injection time signal will be obtained from either a pressure signal or an opening detection signal. The circuits shown in FIGS. 2 and 3 may be replaced with a digital logic circuit or a digital central processing unit of a semiconductor. It is therefore to be understood that, within the scope of the appended claims, the invention may be practiced otherwise than as specifically disclosed.

We claim:

1. A method of automatically controlling the speed of an automobile having a fuel injection engine comprising generating a desired automobile speed signal, an actual automobile speed signal and a negative feedback signal comparing said signals and generating a position control signal to operate and control the engine throttle valve so as to maintain actual automobile speed constant at a desired speed, and characterized in that the negative feedback signal is a signal that indicates fuel injection rate.

2. An automatic speed control system for an automobile having a fuel injection engine and a throttle valve, and comprising:
 a speed signal generator circuit which generates a first electrical signal indicating actual automobile speed;
 desired automobile speed signal supply circuit means which supplies a second electric signal indicating desired automobile speed in response to a speed set operation of the automobile driver;
 an electronic fuel injection control device which produces a fuel injection control signal;
 a feedback signal generator circuit which generates a third electric signal indicating fuel injection rate in response to the fuel injection control signal from the electronic fuel injection control device;
 a comparator circuit combining said first, second and third signals to provide an engine throttle valve control signal; and
 servomotor means for driving the throttle valve in response to the throttle valve control signal.

3. Automobile speed control system as claimed in claim 2 wherein the desired automobile speed signal supply circuit means comprises a memory circuit having a memory capacitor, an impedance converter means connected to the memory capacitor for supplying the second electric signal, and a switching means which is connected to the memory capacitor and energized to close and connect the memory capacitor to the first electric signal in response to the speed set operation of the driver.

4. Automobile speed control system as claimed in claim 2 wherein the feedback signal generator circuit comprises an integration circuit which receives the pulsating fuel injection control signal indicating fuel injection duration from the electronic fuel injection control device.

5. Automobile speed control system as claimed in claim 2 wherein the servomotor means comprises a solenoid valve which is energized by the throttle valve control signal through an amplifier, and a vacuum actuator which is driven by the vacuum pressure in the engine intake manifold through the solenoid valve.

6. Automobile speed control system as claimed in claim 2, further comprising a memory capacitor storing said second signal, and wherein the feedback signal generator circuit comprises an integration circuit which receives the pulsating fuel injection control signal indicating fuel injection duration from the electronic fuel injection control device, a first switching means connected in parallel with an integration capacitor in the integration circuit and a second switching means connected between the integration circuit and the memory capacitor, an impedance converter means connected to the memory capacitor for supplying the second electric signal, and circuit means for controlling the ON, OFF states of the first and second switching means.

7. An automatic speed control system for an automobile having a fuel injection engine and a throttle valve, and comprising
 a speed signal generator circuit which generates a first electrical signal indicating actual automobile speed;
 a memory circuit having a memory capacitor, an impedance converter means connected to the memory capacitor for supplying a second electric signal indicating desired automobile speed and a switching means connected to the memory capacitor for supplying it with the first electric signal;
 a switch circuit having a set switch which energizes the switching means in the memory circuit to turn ON;
 an electronic fuel injection control device which produces a pulsating fuel injection control signal;
 an integration circuit which receives the pulsating fuel injection control signal from the electronic fuel injection control device and generates a third electric signal indicating fuel injection duration;
 a comparator circuit combining said first, second and third signals to provide a throttle valve control signal; and
 servomotor means for positioning the throttle valve and comprising a solenoid valve which is energized by the throttle valve control signal through an amplifier, and a vacuum actuator which is driven by the vacuum pressure in the engine intake manifold through the solenoid valve.

* * * * *